United States Patent
Tibbott et al.

(10) Patent No.: US 7,850,428 B2
(45) Date of Patent: Dec. 14, 2010

(54) AEROFOILS

(75) Inventors: Ian Tibbott, Lichfield (GB); Edwin Dane, Nottingham (GB)

(73) Assignee: Rolls-Royce plc, London (GB)

( * ) Notice: Subject to any disclaimer, the term of this patent is extended or adjusted under 35 U.S.C. 154(b) by 942 days.

(21) Appl. No.: 11/707,997

(22) Filed: Feb. 20, 2007

(65) Prior Publication Data

US 2008/0273988 A1      Nov. 6, 2008

(30) Foreign Application Priority Data

Feb. 24, 2006   (GB) .................................. 0603705.5

(51) Int. Cl.
*F01D 5/08* (2006.01)
*F01D 5/18* (2006.01)
(52) U.S. Cl. ..................... 416/97 R; 415/115
(58) Field of Classification Search ................ 415/115, 415/116; 416/97 R, 96 R, 96 A
See application file for complete search history.

(56) References Cited

U.S. PATENT DOCUMENTS

| | | | |
|---|---|---|---|
| 4,229,140 A * | 10/1980 | Scott | 416/97 R |
| 5,243,759 A * | 9/1993 | Brown et al. | 29/889.721 |
| 5,378,108 A | 1/1995 | Zelesky | |
| 6,609,891 B2 * | 8/2003 | Leeke et al. | 416/97 R |
| 2005/0191167 A1 * | 9/2005 | Mongillo et al. | 415/115 |

FOREIGN PATENT DOCUMENTS

EP     1 288 436 A     4/2004

* cited by examiner

*Primary Examiner*—Igor Kershteyn
(74) *Attorney, Agent, or Firm*—Jeffrey S. Melcher; Manelli Denison & Selter PLLC (57) ABSTRACT

An aerofoil 20 for a gas turbine engine includes a root portion 22, a tip portion 24 located radially outwardly of the root portion 22, leading and trailing edges 26, 28 extending between the root portion 22 and the tip portion 24 and an internal cooling passage 34. The aerofoil 20 includes a plurality of cooling fluid discharge apertures 36 extending between the root portion 22 and the tip portion 24 in a trailing edge region 28a to discharge cooling fluid from the internal cooling passage 34 to an outer surface 31 of the aerofoil in the trailing edge region 28a and thereby provide a cooling film in the trailing edge region 28a. The cooling fluid discharge apertures 36 are arranged so that the flow rate of the cooling fluid discharged from the internal cooling passage 34 to the outer surface trailing edge region 28a varies between the root portion 22 and the tip portion 24.

10 Claims, 9 Drawing Sheets

AEROFOILS

CROSS-REFERENCE TO RELATED APPLICATIONS

This application claims priority to GB 0603705.5, filed 24 Feb. 2006.

BACKGROUND OF THE INVENTION

Embodiments of the present invention relate aerofoils, and in particular to aerofoils for gas turbine engines.

The efficiency and hence performance of gas turbine engines can be increased by increasing the gas temperature at which the engine operates, and it is therefore desirable to operate gas turbine engines at the highest possible temperature. The maximum operating temperature is, however, limited by the temperatures which the various components of the engine can withstand without failure.

Aerofoils, such as nozzle guide vanes (NGVs) and blades, and especially those used in high pressure turbine stages, are subject to very high temperatures during expansion of hot combustion gases from the combustion arrangement through the turbine. In order to prevent failure of such aerofoils, it is necessary to cool them, for example using high pressure air from the compressor which has bypassed the combustion arrangement. The air from the compressor can be fed into an internal cooling passage defined within the aerofoils.

One of the most difficult regions of an aerofoil to cool is the trailing edge region. This is usually because cooling fluid, which is conventionally introduced into the internal cooling passage at the leading edge of the aerofoil, has progressively absorbed heat as it passes rearwards inside the aerofoil, along the internal cooling passage, towards the trailing edge region, where it exits the internal cooling passage to provide a cooling film on the outside of the aerofoil along the trailing edge region.

It would therefore be desirable to provide an aerofoil which enables the trailing edge region to be cooled more effectively.

SUMMARY OF THE INVENTION

According to a first aspect of the present, invention, there is provided an aerofoil including a root portion, a tip portion located radially outwardly of the root portion, leading and trailing edges extending between the root portion and the tip portion and an internal cooling passage, the aerofoil including a plurality of cooling fluid discharge apertures extending between the root portion and the tip portion in a trailing edge region to discharge cooling fluid from the internal cooling passage to an outer surface of the aerofoil in the trailing edge region and thereby provide an outer surface cooling film in the trailing edge region, characterised in that the cooling fluid discharge apertures are arranged so that the flow rate of the cooling fluid discharged from the internal cooling passage to the outer surface trailing edge region varies between the root portion and the tip portion.

Where the term radial is used in this specification in relation to the aerofoil, it refers to the orientation of the aerofoil when mounted in a gas turbine engine. Thus, the radial direction is along the length of the aerofoil between the root portion and the tip portion.

The cooling fluid discharge apertures may be arranged to vary the flow rate of the cooling fluid discharged to the outer surface trailing edge region between the root portion and the tip portion preferably to maintain the trailing edge region at a substantially constant temperature, in use, between the root portion and the tip portion.

The cooling fluid discharge apertures may be generally equispaced between the root portion and the tip portion.

Each of the plurality of cooling fluid discharge apertures may be arranged to discharge the cooling fluid from the internal cooling passage to the outer surface at a predetermined distance from the trailing edge, and the predetermined distance may vary between the root portion and the tip portion.

The flow rate of cooling fluid discharged from the internal cooling passage through a cooling fluid discharge aperture may increase as the predetermined distance between the aperture and the trailing edge decreases, and may decrease as the predetermined distance between the aperture and the trailing edge increases.

In one embodiment, the predetermined distance between each cooling fluid discharge aperture and the trailing edge may decrease from the root portion towards a central region between the root portion and tip portion, and may increase from the central region towards the tip portion. The predetermined distance may decrease to a minimum value in the central region.

In an alternative embodiment, the predetermined distance between each cooling fluid discharge aperture and the trailing edge may increase from the root portion towards the tip portion. The predetermined distance may increase from a minimum value at the root portion to a maximum value at the tip portion.

In another alternative embodiment, the predetermined distance between each cooling fluid discharge aperture and the trailing edge may decrease from the root portion towards the tip portion. The predetermined distance may decrease from a maximum value at the root portion to a minimum value at the tip portion.

The cooling fluid discharge apertures may be arranged so that the difference between the pressure on the outer surface of the aerofoil at the outlets of the cooling fluid discharge apertures and the pressure in the internal cooling passage varies between the root portion and the tip portion.

The difference between the pressure on the outer surface of the aerofoil at the outlet of a cooling fluid discharge aperture and the pressure in the internal cooling passage may decrease as the predetermined distance between the cooling fluid discharge aperture and the trailing edge increases, and may increase as the predetermined distance between the aperture and the trailing edge decreases.

The aerofoil may include concave and convex walls, and the cooling fluid discharge apertures may be defined in or by the concave wall, and may be defined by the concave and the convex walls.

In one embodiment, the cooling fluid discharge apertures may comprise a plurality of cooling holes extending through the concave wall between the internal cooling passage and the outer surface. The cooling holes may be arranged to direct cooling fluid from the internal cooling passage onto the outer surface of the concave wall. Alternatively, part of the concave wall may include a cutback portion and the cooling holes may be arranged to direct cooling fluid from the internal cooling passage onto the convex wall.

In another embodiment, the cooling fluid discharge apertures may comprise a plurality of slots defined between the concave and the convex walls.

The aerofoil may be adapted for use in a gas turbine engine. The aerofoil may be a blade or a guide vane for a gas turbine engine.

According to a second aspect of the present invention, there is provided a gas turbine engine including an aerofoil according to the first aspect of the invention.

BRIEF DESCRIPTION OF THE DRAWINGS

Embodiments of the present invention will now be described by way of example only and with reference to the accompanying drawings, in which:

FIGS. 2a, 3a and 4a are diagrammatic perspective views of parts of first, second and third embodiments of an aerofoil according to the invention;

FIGS. 2b, 3b and 4b are cross-sectional views along the lines A-A, B-B and C-C respectively of FIGS. 2a, 3a and 4a;

FIG. 5 is a diagrammatic sectional view through the aerofoil of FIG. 2a;

FIG. 7b is a diagrammatic side view of a nozzle guide vane according to the invention adapted for the profile illustrated in FIG. 7a;

FIG. 7c is a diagrammatic perspective view of a blade according to the invention adapted for the profile illustrated in FIG. 7a;

DETAILED DESCRIPTION OF THE INVENTION

Figure 1:
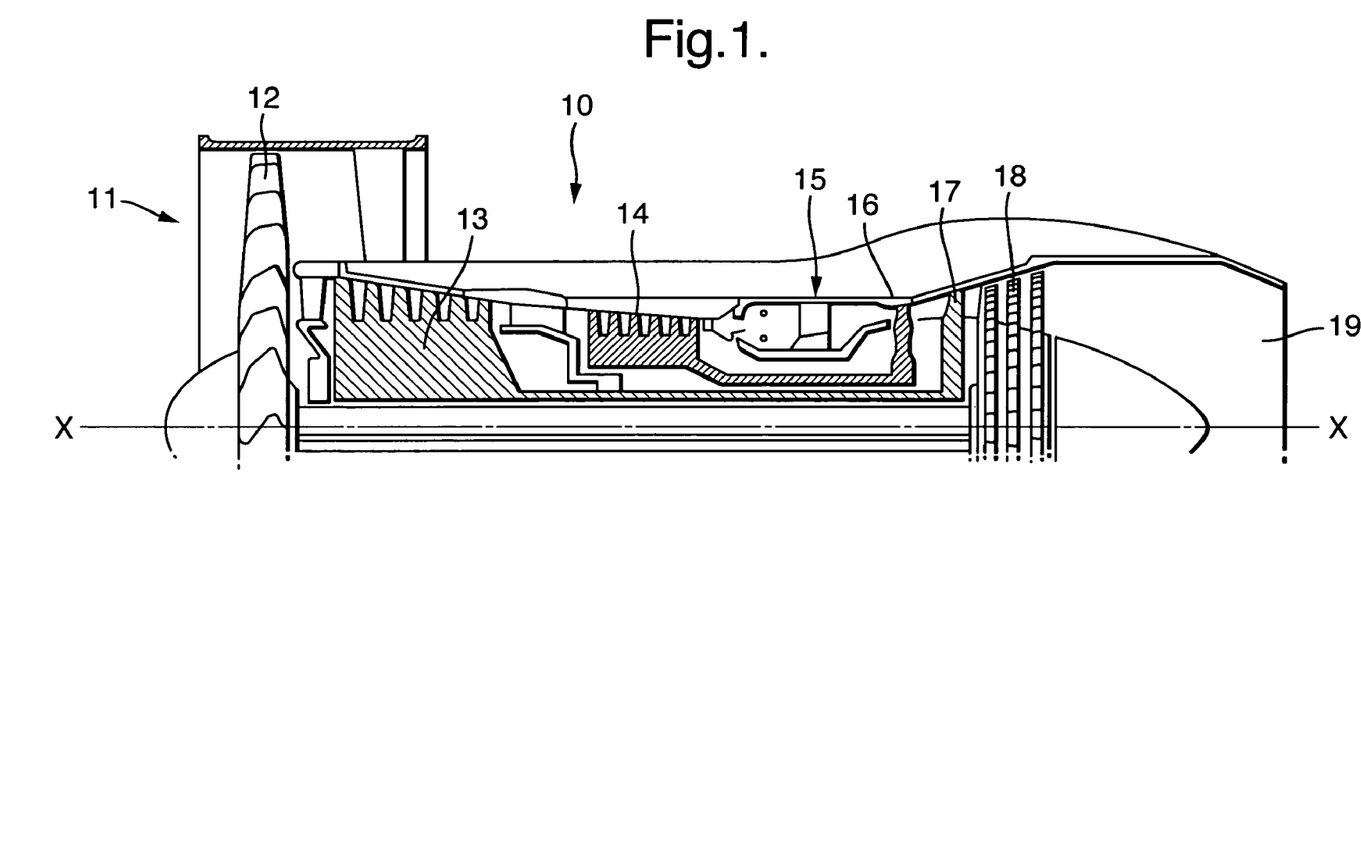
FIG. 1 is a diagrammatic cross-sectional view of a gas turbine engine.

Referring to FIG. 1, a gas turbine engine is generally indicated at 10 and comprises, in axial flow series, an air intake 11, a propulsive fan 12, an intermediate pressure compressor 13, a high pressure compressor 14, a combustion arrangement 15, a high pressure turbine 16, an intermediate pressure turbine 17, a low pressure turbine 18 and an exhaust nozzle 19.

The gas turbine engine 10 works in a conventional manner so that air entering the intake 11 is accelerated by the fan 12 which produces two air flows: a first air flow into the intermediate pressure compressor 13 and a second air flow which provides propulsive thrust. The intermediate pressure compressor 13 compresses the air flow directed into it before delivering that air to the high pressure compressor 14 where further compression takes place.

The compressed air exhausted from the high pressure compressor 14 is directed into the combustion arrangement 15 where it is mixed with fuel and the mixture combusted. The resultant hot combustion products then expand through, and thereby drive, the high, intermediate and low pressure turbines 16, 17 and 18 before being exhausted through the nozzle 19 to provide additional propulsive thrust. The high, intermediate and low pressure turbines 16, 17 and 18 respectively drive the high and intermediate pressure compressors 14 and 13, and the fan 12 by suitable interconnecting shafts.

Figures 2A, 2B:
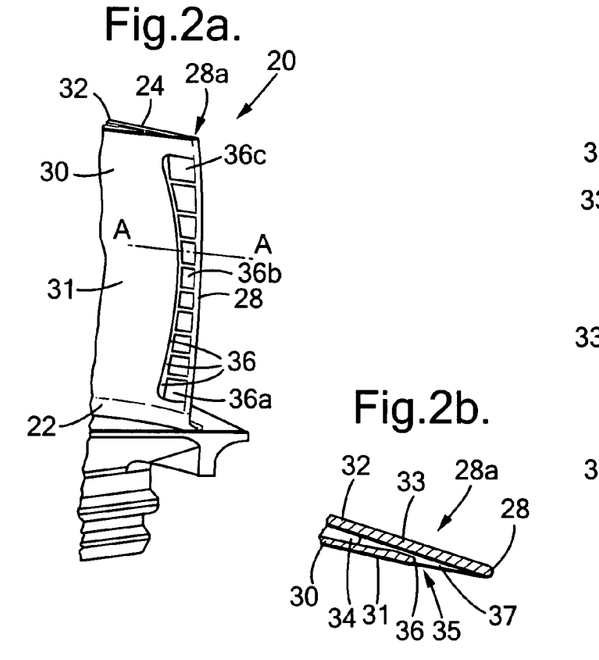
Figure 5:
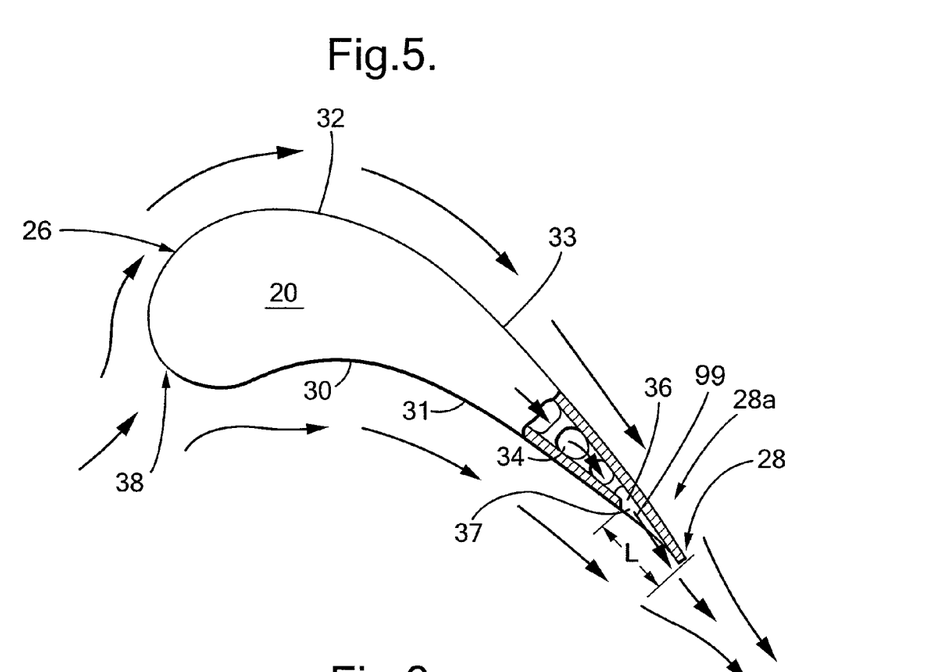

Referring to FIGS. 2 and 5, there is shown an aerofoil 20 according to one embodiment of the invention for use in a gas turbine engine such as the engine 10 described above. The aerofoil 20 shown in FIG. 2 is a blade. The aerofoil 20 may however be a guide vane, such as a nozzle guide vane.

The aerofoil 20 includes a root portion 22, a tip portion 24 located radially outwardly of the root portion 22, and leading and trailing edges 26, 28 extending between the root portion 22 and the tip portion 24. The aerofoil 20 includes a concave wall 30 having an outer surface 31, also known as a pressure surface, and a convex wall 32 having an outer surface 33, also known as a suction surface, and the concave and convex walls 30, 32 define an internal cooling passage 34 (only part of which is shown in FIG. 5) in the aerofoil 20 through which cooling fluid, such as cooling air from the high pressure compressor 14 that has bypassed the combustion arrangement 15, flows.

The aerofoil 20 includes a plurality of cooling fluid discharge apertures 36 which extend between the root portion 22 and the tip portion 24 in a trailing edge region 28a of the aerofoil 20. In embodiments of the invention, the cooling fluid discharge apertures 36 are generally equispaced between the root portion 22 and the tip portion 24. However, unequally spaced apertures or apertures of varying sizes may be employed by the skilled artisan depending on particular blade or vane cooling requirements. The cooling fluid discharge apertures 36 are arranged to discharge cooling fluid from the internal cooling passage 34 to an outer surface of the aerofoil 20 in the trailing edge region 28a to provide an outer surface cooling film, as illustrated by the arrow 99 in FIG. 5, in the trailing edge region 28a.

The cooling fluid discharge apertures 36 are arranged to discharge cooling fluid onto the outer surface 31 of the concave wall 30. In the aerofoil 20 shown in FIGS. 2 and 5, the cooling fluid discharge apertures 36 comprise a plurality of cooling slots defined between the concave and the convex walls 30, 32.

Figure 3A:
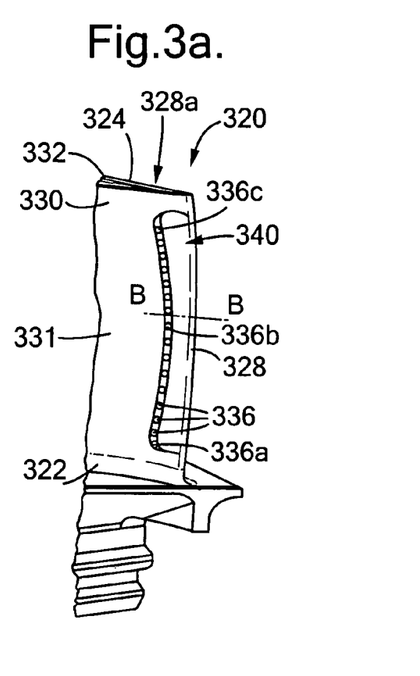
Figures 3B, 4A, 4B:
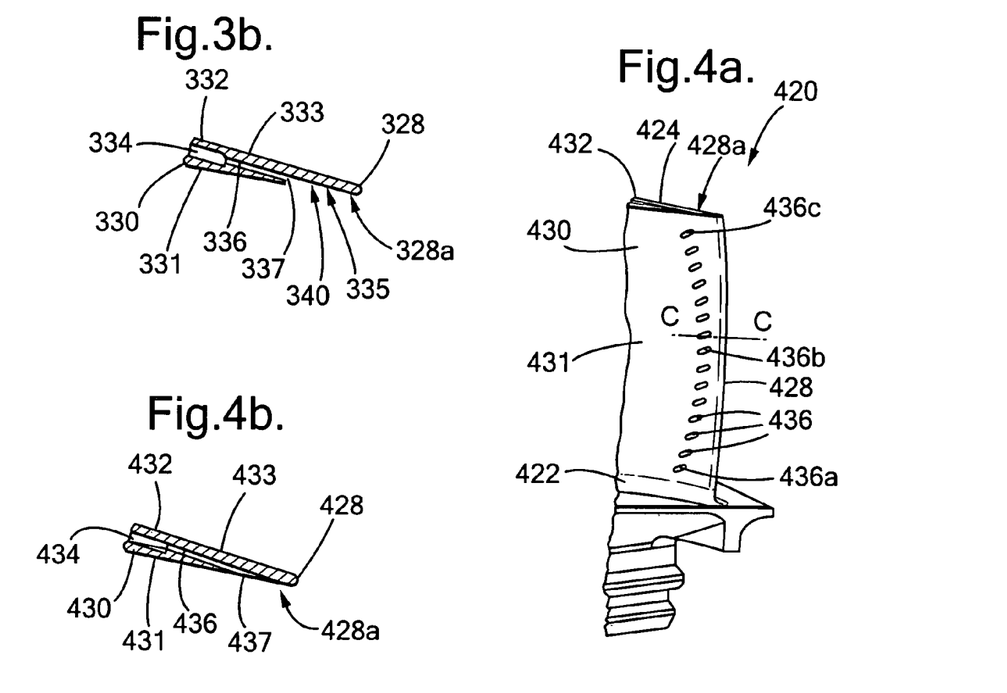

An alternative embodiment of the aerofoil 20 is shown in FIGS. 3a and 3b, and corresponding components are designated by the same reference numerals prefixed with the number '3'. In the aerofoil 320, part of the concave wall 330 has been removed to define a cutback portion 340, and the cooling fluid discharge apertures 336, which are in the form of cooling holes, are arranged to direct cooling fluid from the internal cooling passage 334 onto part of the convex wall 332 which has been exposed by the cutback portion 340.

The cutback portion 340 is defined in the trailing edge region 28a and provides a shield 35, 335 helping to prevent working gas passing over the aerofoil mixing with the cooling film.

Another embodiment of the aerofoil 20 is shown in FIGS. 4a and 4b, and corresponding components are designated by the same reference numerals prefixed with the number '4'. In the aerofoil 420, the cooling fluid discharge apertures 436 are in the form of cooling holes which extend through the concave wall 430 between the internal cooling passage 434 and the outer surface 431 of the concave wall 430.

Where the following description refers to the aerofoil 20 of FIGS. 2 and 5, it should be understood that it applies equally to the aerofoils 320, 420 of FIGS. 3 and 4.

According to the invention, the cooling fluid discharge apertures 36 are arranged to vary the flow rate of the cooling fluid discharged from the internal cooling passage 34 to the outer surface trailing edge region 28a of the aerofoil 20 between the root portion 22 and the tip portion 24.

Figure 6:
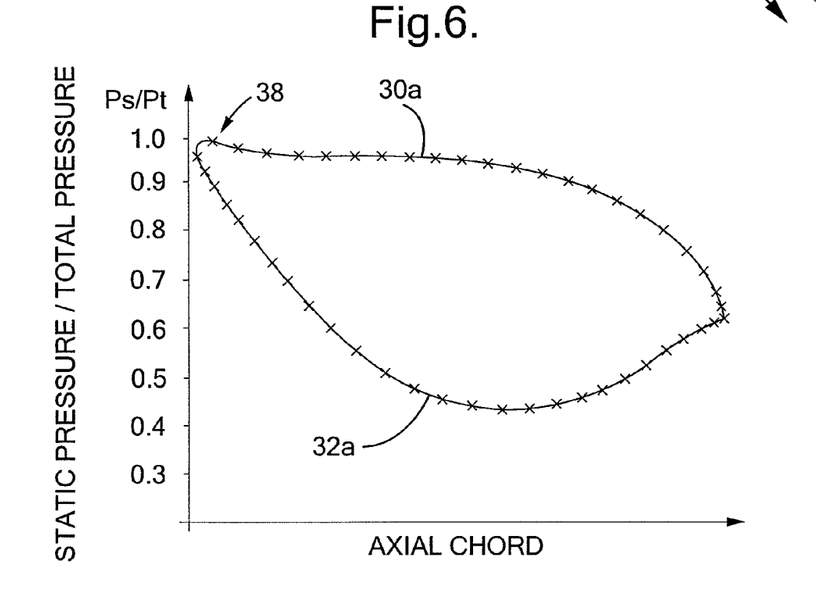
FIG. 6 is a graphic illustration of the static pressure distribution across the outer surfaces of the aerofoil of FIG. 5.

FIG. 6 illustrates the static pressure distribution along the outer surfaces 31, 33 of the concave and convex walls 30, 32 of the aerofoil 20 of FIG. 5. In FIG. 6, the upper line 30a shows the pressure distribution along the outer surface 31 of the concave wall 30 and the lower 32a line shows the pressure distribution along the outer surface 33 of the convex wall 32.

As combustion gases from the combustion arrangement 15 of the gas turbine engine 10 flow towards the aerofoil 20, the combustion gas flow separates at a stagnation point 38 along the leading edge 26 to provide separate gas flows along the outer surfaces 31, 33 of the concave and convex walls 30, 32. At the stagnation point, the static pressure ($P_S$) and total pressure ($P_T$) are equal, providing a static pressure to total pressure ratio ($P_S/P_T$) of 1.0, as illustrated in FIG. 6.

As will be understood from FIG. 6, the static pressure on the outer surface 31 of the concave wall 30 remains relatively high for approximately 75% of the distance along the axial cord. The static pressure then falls more rapidly towards the trailing edge region 28a, and at the trailing edge 28 is approximately 60% of the total pressure at the stagnation point 38.

The axial chord location at which cooling fluid flowing in the internal cooling passage 34 is discharged from the internal cooling passage 34 to the outer surface 31 of the concave wall 30 determines the static pressure to which the cooling film, created as a result of discharge of the cooling fluid through the cooling fluid discharge apertures 36, flows.

The pressure inside the internal cooling passage 34 will generally be greater than the total pressure at the stagnation point 38 to prevent hot combustion gases being drawn into the internal cooling passage 34. As will be understood by those skilled in the art, the difference between the pressure inside the internal cooling passage 34 and the static pressure on the outer surface 31 of the concave wall 30 at the outlet 37 of a given cooling fluid discharge aperture 36 will determine the flow rate of cooling fluid discharged from that aperture 36. As the pressure difference increases, the flow rate of discharged fluid will also increase and as the pressure difference decreases, the flow rate of discharged fluid will also decrease.

As explained above, the static pressure on the outer surface 31 of the concave wall 30 varies between the leading edge 26 and the trailing edge 28. Accordingly, by varying the position of the outlets 37 of the cooling fluid discharge apertures 36 on the outer surface 31 of the concave wall 30, the flow rate of cooling fluid discharged from the internal cooling passage 34 onto the outer surface 31 of the concave wall 30 through the cooling fluid discharge apertures 36 can be varied.

In particular, for a given cooling fluid discharge aperture 36, as the distance L, commonly known as cutback length, between the aperture outlet 37 and the trailing edge 28 increases, the flow rate of cooling fluid discharged from the internal cooling passage 34 through the aperture 36 decreases as a result of the decrease in the difference between the pressure on the outer surface 31 of the concave wall 30 at the aperture outlet 37 and the pressure in the internal cooling passage 34. Conversely, as the distance L decreases, the flow rate of cooling fluid discharged from the internal cooling passage 34 increases due to the increase in pressure difference.

By varying the distance L between the outlet of each of the cooling fluid discharge apertures 36 and the trailing edge 28 between the root portion 22 and the tip portion 24 of the aerofoil 20, the flow rate of cooling fluid that is discharged from the internal cooling passage 34 to the outer surface trailing edge region 28a can be varied between the root portion 22 and the tip portion 24. As indicated above, this is because the difference between the pressure on the outer surface 31 of the concave wall 30 at the outlets 37 of the cooling fluid discharge apertures 36 and the pressure in the internal cooling passage 34 varies between the root portion 22 and the tip portion 24. Embodiments of the invention therefore provide an advantage that the amount of cooling provided to different regions of the trailing edge region 28a, between the root portion 22 and tip portion 24, by the outer surface cooling film can be varied by varying the distance L between the cooling fluid discharge apertures 36 and the trailing edge 28.

Generally, the temperature of the combustion gases flowing across the outer surfaces 31, 33 of the concave and convex walls 30, 32 of the aerofoil 20 varies in use between the root portion 22 and the tip portion 24. By locating the outlets 37 of the cooling fluid discharge apertures 38 at suitable positions in the concave wall 30, a greater flow rate of cooling fluid can be discharged from the internal cooling passage 34 to regions of the trailing edge region 28a between the root portion 22 and the tip portion 24 where the combustion gas temperature is greater, and vice-versa. The trailing edge region 28a can thus be maintained as a substantially uniform temperature in the case of nozzle guide vanes and to have a desired temperature gradient in the case of rotor blades, in use, between the root portion 22 and the tip portion 24.

The present invention includes a plurality of cooling fluid discharge apertures 36 comprising at least first, second and third apertures 36a, 36b, 36c, where the distance L for the second aperture 36b is less than L for both the first and third apertures 36a, 36c. Thereby the flow rate of the cooling fluid discharged from the internal cooling passage 34 to the outer surface trailing edge region 28a varies and has a maximum flow rate between the root portion 22 and the tip portion 24. The maximum flow rate is positioned where the greatest cooling is required. The first and third apertures 36a, 36c are usually adjacent the root portion 22 and the tip portion 24 respectively, where a lower temperatures are found.

The distance L for the first aperture 36a may be greater, equal or less than that of the third aperture 36c and will depend on the temperature profile experienced near the root or tip.

Figure 7A:
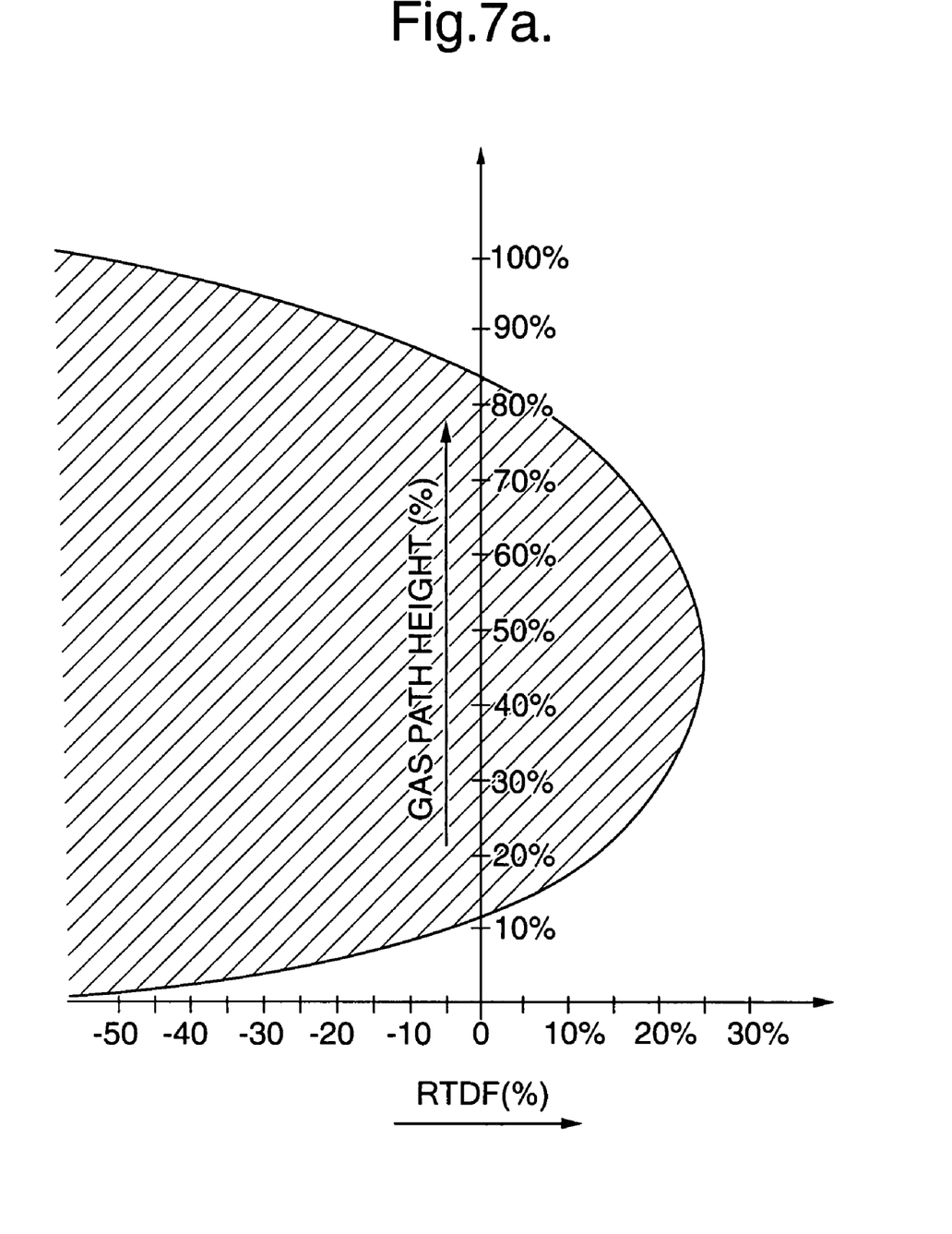
FIG. 7a illustrates a first combustion arrangement radial profile.
Figure 8A:
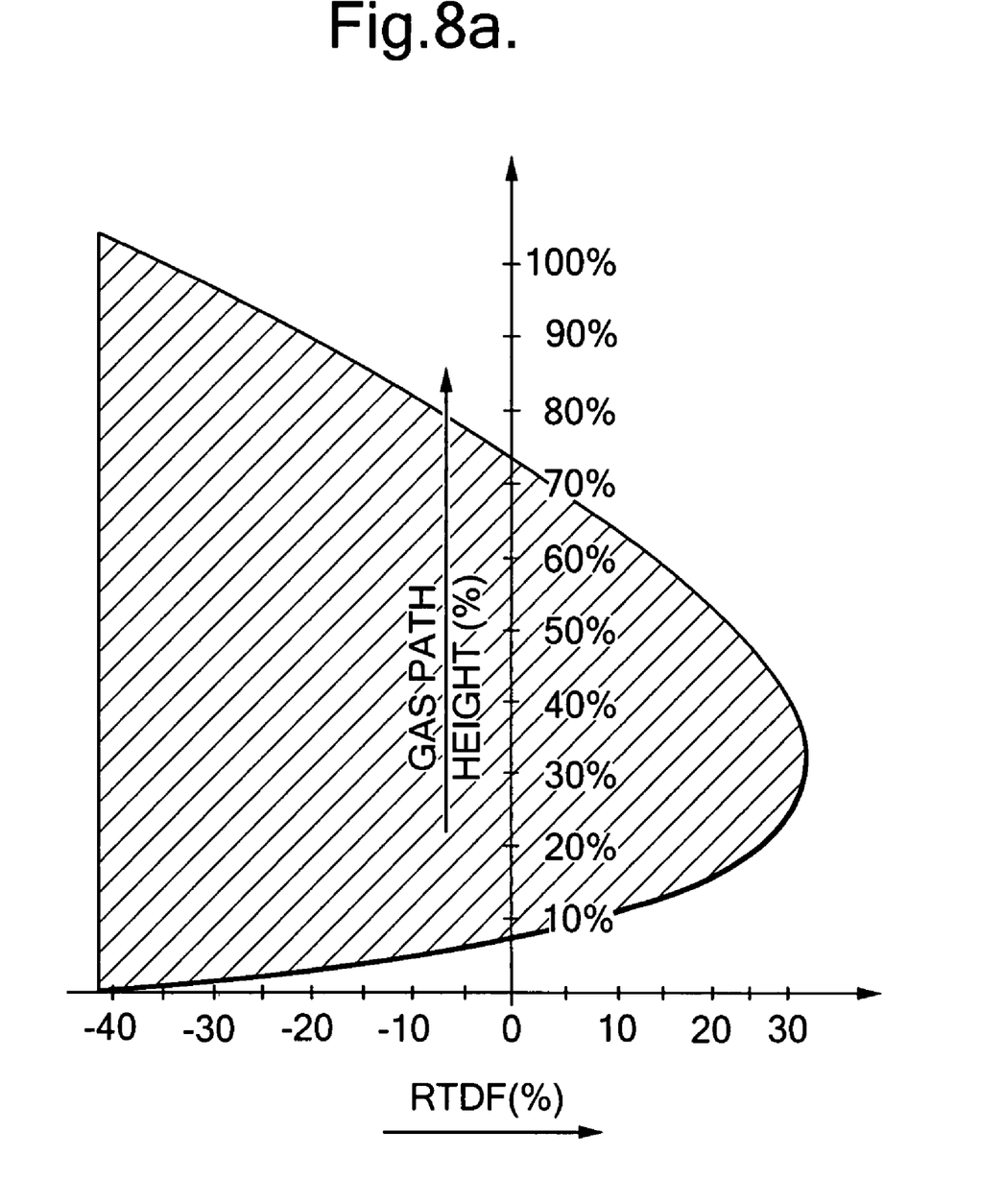
FIGS. 8a to 8c are similar to FIGS. 7a to 7c but relate to a second combustion arrangement radial profile.
Figure 9A:
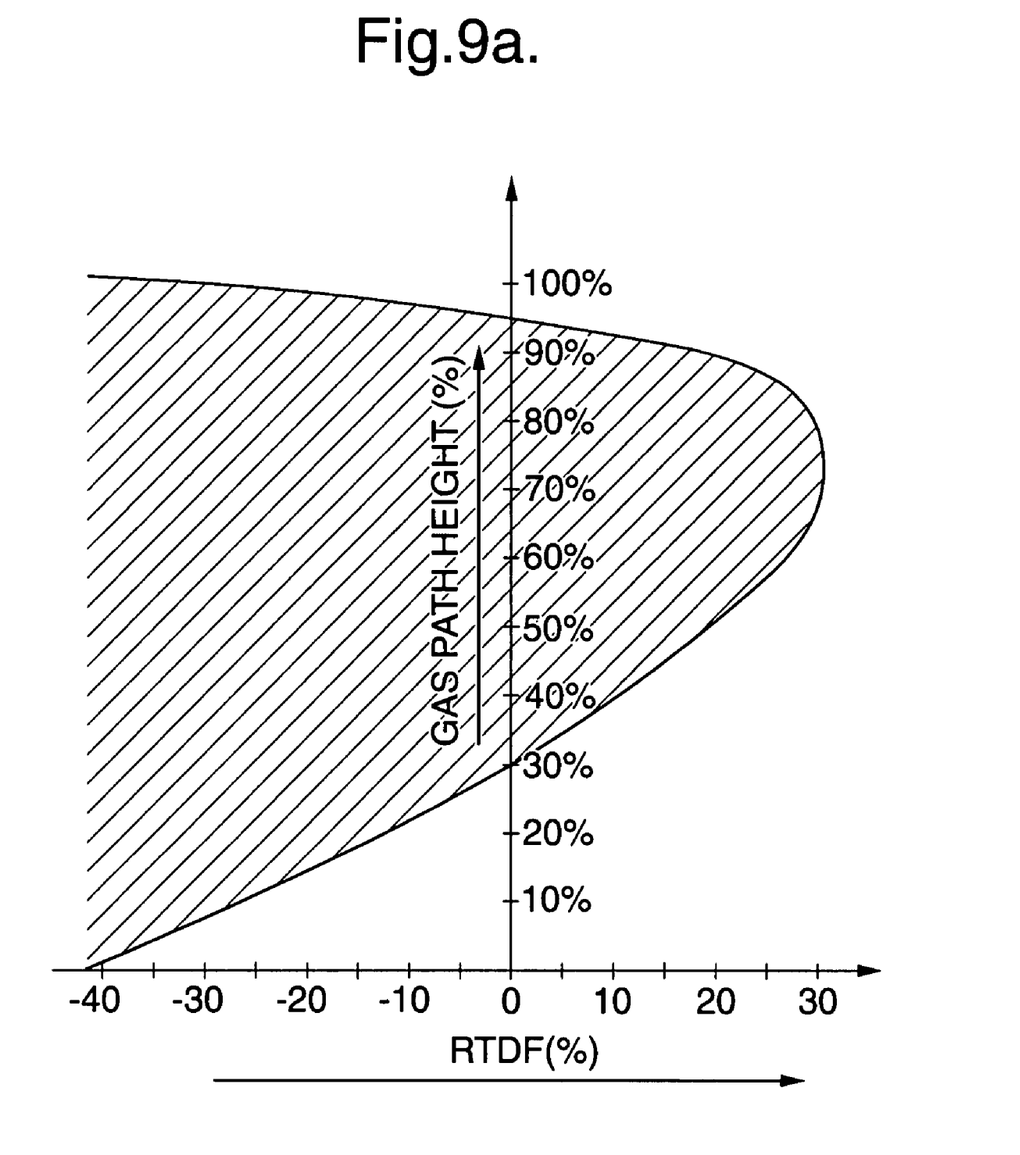
FIGS. 9a to 9c are similar to FIGS. 7a to 7c but relate to a third combustion arrangement radial profile.

FIGS. 7a, 8a and 9a show radial temperature distribution profiles for different combustion arrangements 15. In each profile, the x-axis shows the radial temperature distribution factor (RTDF) which provides an indication of the temperature of the combustion gases flowing across the outer surfaces 31, 33 of the aerofoil 20. The y-axis shows the gaspath height, a gaspath height of 0% corresponding to the root portion 22 of the aerofoil 20 in use and a gaspath height of 100% corresponding to the tip portion 24 of the aerofoil 20.

FIGS. 7b, 7c, 8b, 8c, 9b and 9c illustrate aerofoils 720, 820, 920 adapted for use with the different combustion profiles. The aerofoils 720, 820, 920 are similar to the aerofoil 20 shown in FIGS. 2 and 5, and corresponding components are therefore designated with the same reference numerals prefixed by the number '7', '8' or '9'.

FIG. 7a shows a typical radial temperature profile distribution that is parabolic in shape and that peaks at approximately mid-passage height. Accordingly, the combustion gas temperatures to which the aerofoil 720 is subjected are lowest at the root portion 722 and the tip portion 724, and reach a maximum in a central region, approximately mid-way between the root portion 22 and the tip portion 24. Greater cooling of the aerofoil 720 in the trailing edge region 728a by the outer surface cooling film is therefore required in the central region, between the root portion 722 and tip portion 724, whilst less cooling is required towards the root portion 722 and the tip portion 724.

Figure 7B:
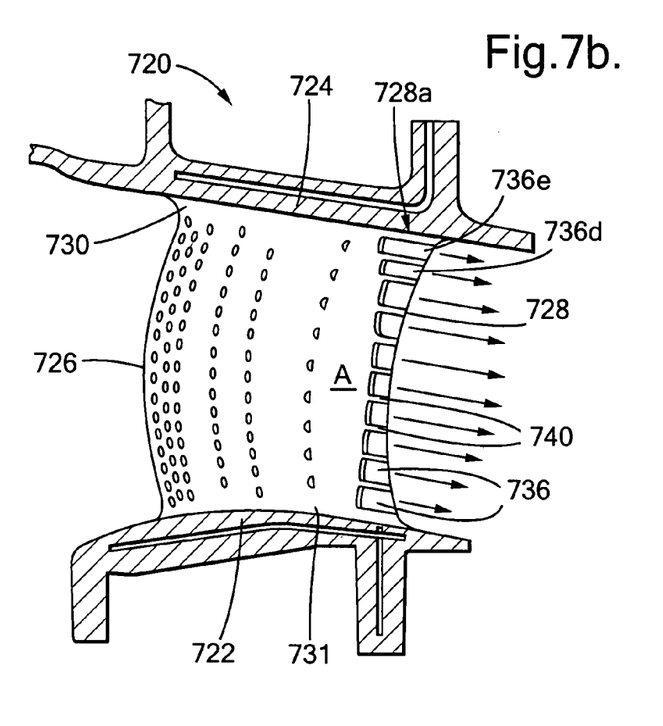
Figure 7C:
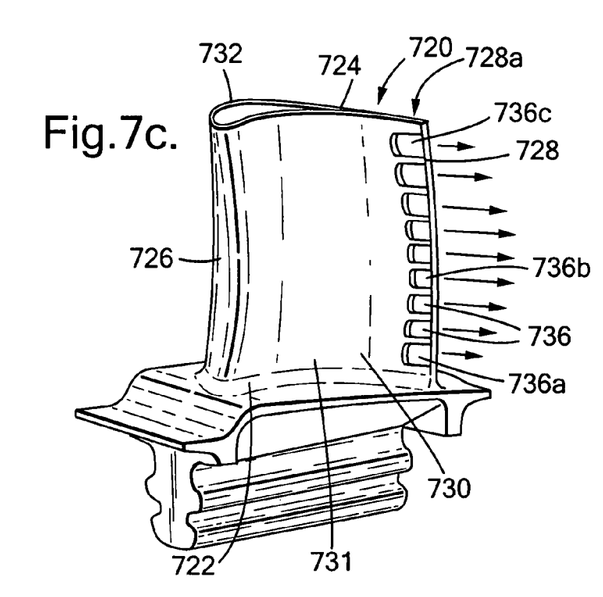

Accordingly, referring to FIGS. 7b and 7c which illustrate a guide vane and a blade respectively adapted for use with a combustion arrangement 15 having the profile illustrated in FIG. 7a, the distance between the cooling fluid discharge apertures 736 and the trailing edge 728 is lower in the central region than at the root portion 722 and the tip portion 724, thereby providing a greater flow rate of cooling fluid from the internal cooling passage 734 to the outer surface 731 of the concave wall 730 in the central region between the root portion 722 and the tip portion 724 where greater cooling is required.

As can be seen in FIGS. 7a (and 8a, 9a), the RTDF comprises particularly steep gradients near the root and tip portions 22, 24. In these regions the cooling apertures may be further arranged to improve cooling fluid flows. In FIG. 7b, the apertures 736 have equal radial height except the apertures 736d and 736e that are approximately half height. Here the distance L of the apertures 736d and 736e is increased to match the steep gradient of the RTDF. The apertures 736 may be further arranged to improve cooling where local effects of temperature and pressure exist, such as providing further variation in the radial height of the apertures as well as their distance L from the trailing edge.

FIG. 8a shows a radial temperature profile distribution that has a skewed parabolic shape and that peaks at approximately 25% passage height. Accordingly, the combustion gas temperatures to which the aerofoil 820 is subjected peak at approximately 25% passage height and are lower at the tip portion 824 than at the root portion 822. Greater cooling of the aerofoil 820 in the trailing edge region 828a by the outer surface cooling film is therefore required towards a lower central region of the trailing edge region 828a whilst less cooling is required towards the tip portion 824.

Figure 8B:
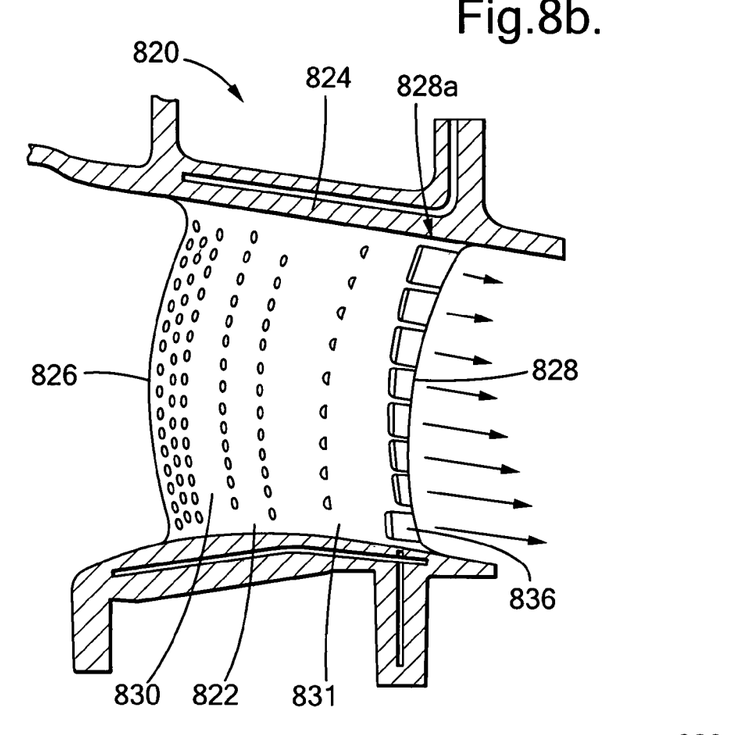
Figure 8C:
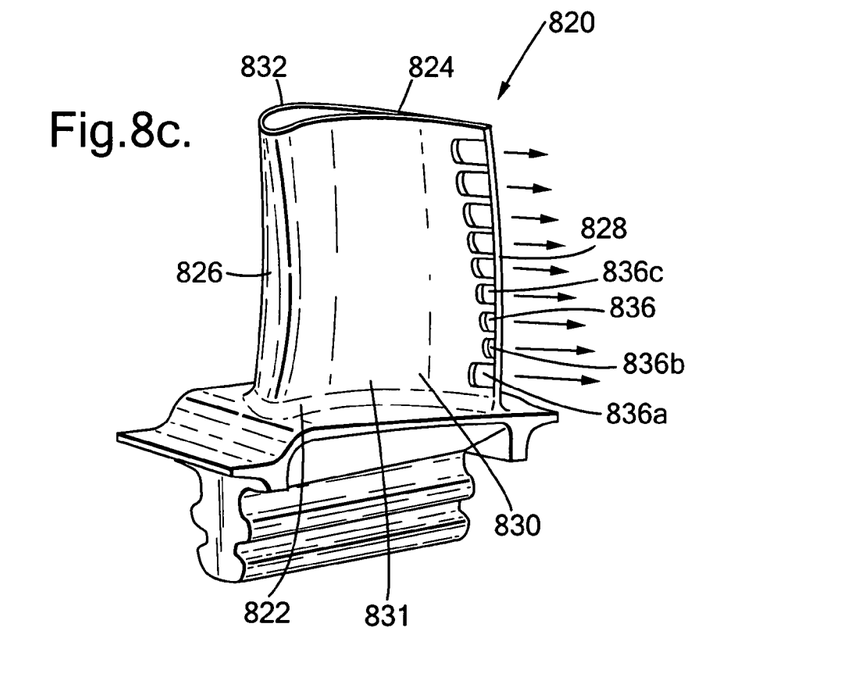

Accordingly, referring to FIGS. 8b and 8c which illustrate a guide vane and a blade respectively adapted for use with a combustion arrangement 15 having the profile illustrated in FIG. 8a, the distance between the cooling fluid discharge apertures 836 and the trailing edge 828 is at a minimum in the lower central region, thereby providing a greater flow rate of cooling fluid from the internal cooling passage 834 to the outer surface 831 of the concave wall 830 where greater cooling is required. In order to provide a substantially uniform temperature along the trailing edge region 828a of the aerofoils 820 of FIGS. 8b and 8c, the distance between each of the cooling fluid discharge apertures 836 and the trailing edge 828 increases from a minimum value close to the root portion 822 to a maximum value at the tip portion 824.

FIG. 9a shows a radial temperature profile distribution that has a skewed parabolic shape and that peaks at approximately 75% passage height. Accordingly, the combustion gas temperatures to which the aerofoil 920 is subjected peak at approximately 75% passage height and are lower at the root portion 922 than at the tip portion 924. Greater cooling of the aerofoil 920 in the trailing edge region 928a by the outer surface cooling film is therefore required towards an upper central region of the trailing edge region 928a whilst less cooling is required towards the root portion 922.

Figure 9B:
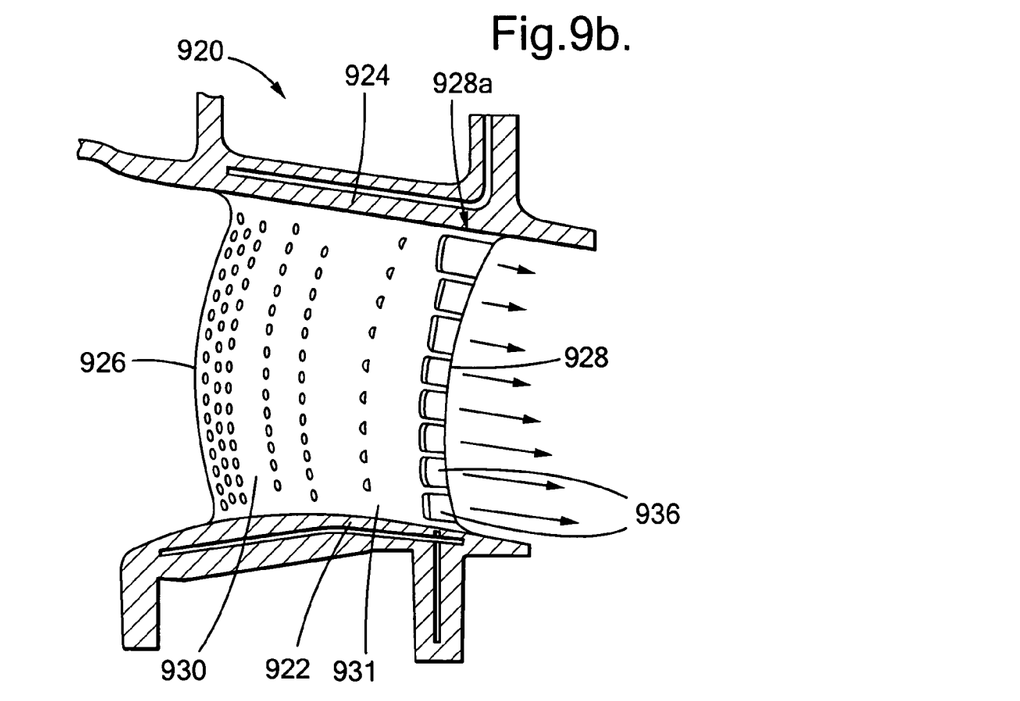
Figure 9C:
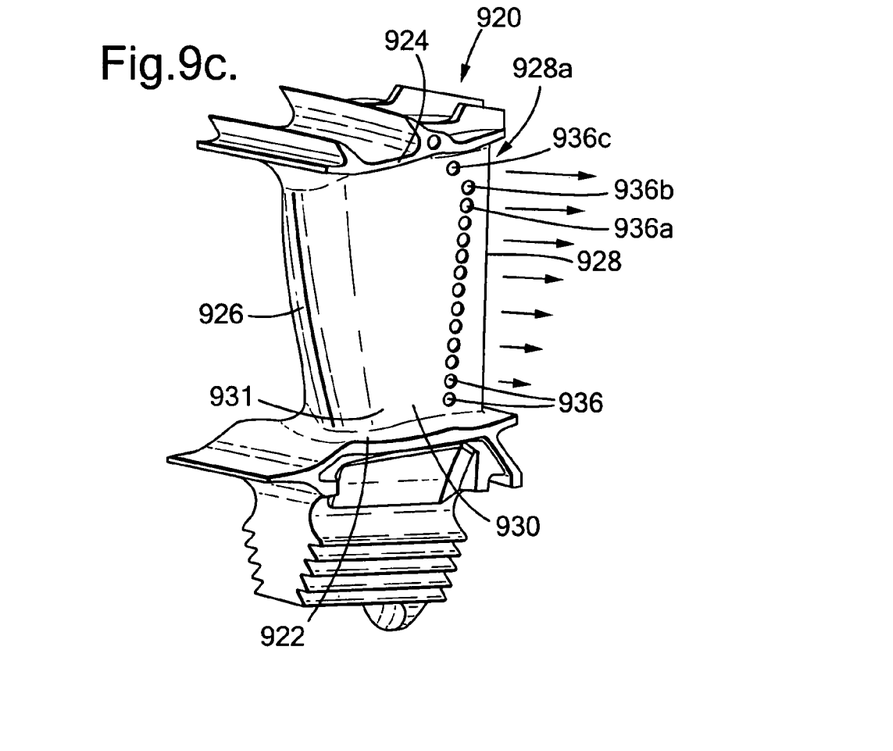

Accordingly, referring to FIGS. 9b and 9c which illustrate a guide vane and a blade respectively adapted for use with a combustion arrangement 15 having the profile illustrated in FIG. 9a, the distance between the cooling fluid discharge apertures 936 and the trailing edge 928 is at a minimum in the upper central region, thereby providing a greater flow rate of cooling fluid from the internal cooling passage 934 to the outer surface 931 of the concave wall 930 where greater cooling is required. In order to provide a substantially uniform temperature along the trailing edge region 928a of the aerofoils 920 of FIGS. 9b and 9c, the distance between each of the cooling fluid discharge apertures 936 and the trailing edge 928 decreases from a maximum value close to the root portion 922 to a minimum value at the tip portion 924.

There is thus provided an aerofoil 20 which provides more effective cooling of the trailing edge region 28a. Aerofoil performance and reliability, and hence the performance and reliability of gas turbine engines incorporating aerofoils according to the invention, are thus improved. In addition to providing a greater flow rate of cooling fluid in the trailing edge region 28a by locating selected cooling fluid discharge apertures 36 closer to the trailing edge 28, cooling of the extreme trailing edge 28 is also enhanced due to the fact that the cooling fluid has flowed across less of the outer surface 31, and has therefore absorbed less heat, by the time it reaches the extreme trailing edge 28.

The cutback portion 340 is defined in the trailing edge region 28a and provides a shield 35 helping to prevent working gas passing over the aerofoil mixing with the cooling film.

Figure 7D:
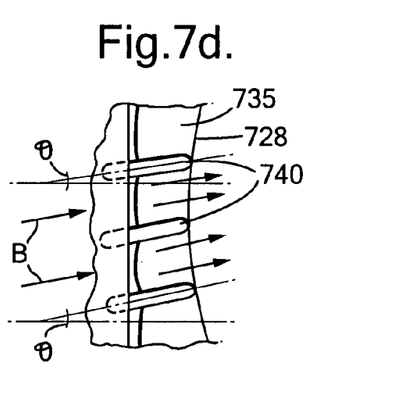
FIG. 7d is an enlarged view on A in FIG. 7b.

In FIGS. 7b and 7d, dividing lands of cut back portions 740 are formed between apertures 736 and extend to the trailing edge 728. The dividing lands of cut back portions 740 help prevent coolant flows from adjacent apertures mixing so that each aperture delivers the desired mount of coolant to the downstream trailing edge region 728a. In FIG. 7d, the dividing lands of cut back portions 740 are angled θ relative to the engine centre-line axis X-X, to align the coolant flow with the working fluid flow B passing over the aerofoil surface. In this way the working fluid flow B is further prevented from mixing with the coolant flow.

Although embodiments of the invention have been described in the preceding paragraphs with reference to various examples, it should be appreciated that various modifications to the examples given may be made without departing from the scope of the present invention, as claimed. For example, the cooling fluid discharge apertures 36 may be of any suitable shape or configuration. Cooling fluid discharge apertures 36 may alternatively or additionally be provided to discharge cooling fluid onto the outer surface 33 of the convex wall 32.

Whilst endeavouring in the foregoing specification to draw attention to those features of the invention believed to be of particular importance, it should be understood that the Applicant claims protection in respect of any patentable feature or combination of features hereinbefore referred to and/or shown in the drawings, whether or not particular emphasis has been placed thereon.

The invention claimed is:

1. An aerofoil comprising:
a root portion;
a tip portion located radially outwardly of the root portion;
leading and trailing edges extending between the root portion and the tip portion;
an internal cooling passage; and
a plurality of cooling fluid discharge apertures extending between the root portion and the tip portion in a trailing edge region to discharge cooling fluid from the internal cooling passage to an outer surface of the aerofoil in the trailing edge region during use and provide a cooling film in the trailing edge region, the plurality of cooling fluid discharge apertures comprising first, second and third apertures, a distance being defined between each aperture and the trailing edge, wherein said distance for the second aperture is less than the distance for each of the first and third apertures so that the flow rate of the cooling fluid discharged from the internal cooling passage to the outer surface trailing edge region varies between the root portion and the tip portion.

2. An aerofoil according to claim 1, wherein the distance is determined for each cooling fluid discharge aperture in order to meter the flow rate of the cooling fluid discharged to the outer surface trailing edge region between the root portion and the tip portion to maintain the trailing edge region at a substantially constant temperature between the root portion and the tip portion.

3. An aerofoil according to claim 1, wherein the cooling fluid discharge apertures are generally equispaced between the root portion and the tip portion.

4. An aerofoil according to claim 1, wherein the aerofoil includes concave and convex walls, and the cooling fluid discharge apertures are defined in or by the concave wall.

5. An aerofoil according to claim 1, wherein the aerofoil is a blade or a guide vane for a gas turbine engine.

6. A gas turbine engine including an aerofoil as defined in claim 1.

7. An aerofoil according to claim 1, wherein either the first or third aperture is adjacent the root or tip portions respectively.

8. An aerofoil according to claim 1, wherein the decrease in distance from the first or third aperture to the second aperture is a uniform amount over each adjacent aperture.

9. An aerofoil according to claim 1, wherein a cutback portion is defined in the trailing edge region and provides a shield to prevent working gas mixing with the cooling film.

10. An aerofoil according to claim 1, wherein the plurality of apertures comprises apertures of different sizes.

* * * * *